(12) United States Patent
Ramet et al.

(10) Patent No.: US 11,159,070 B2
(45) Date of Patent: Oct. 26, 2021

(54) COILED STATOR FOR A ROTARY ELECTRICAL MACHINE

(71) Applicant: Valeo Equipements Electriques Moteur, Creteil (FR)

(72) Inventors: Vincent Ramet, Étaples-sur-Mer (FR); Eric Delcroix, Étaples-sur-Mer (FR); Sébastien Leclercq, Étaples-sur-Mer (FR); Alain Defebvin, Étaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 22 days.

(21) Appl. No.: 16/479,333

(22) PCT Filed: Jan. 17, 2018

(86) PCT No.: PCT/FR2018/050117
§ 371 (c)(1),
(2) Date: Jul. 19, 2019

(87) PCT Pub. No.: WO2018/134523
PCT Pub. Date: Jul. 26, 2018

(65) Prior Publication Data
US 2019/0341823 A1   Nov. 7, 2019

(30) Foreign Application Priority Data

Jan. 23, 2017 (FR) .................................... 1750527

(51) Int. Cl.
*H02K 3/12* (2006.01)
*H02K 3/28* (2006.01)
*H02K 15/04* (2006.01)

(52) U.S. Cl.
CPC ................. *H02K 3/12* (2013.01); *H02K 3/28* (2013.01); *H02K 15/0485* (2013.01)

(58) Field of Classification Search
CPC ......... H02K 3/12; H02K 3/28; H02K 15/0485
(Continued)

(56) References Cited

U.S. PATENT DOCUMENTS

2006/0284510 A1* 12/2006 Tauvron .................. H02K 3/28
                                                              310/180
2010/0164318 A1*  7/2010 Bodin ................ H02K 15/0485
                                                              310/208

FOREIGN PATENT DOCUMENTS

EP       0454039 A1   10/1991
EP       3098945 A1   11/2016
(Continued)

OTHER PUBLICATIONS

International Search Report and Written Opinion in corresponding International Application No. PCT/FR2018/050117, dated May 4, 2018 (9 pages).

*Primary Examiner* — Thomas Truong
(74) *Attorney, Agent, or Firm* — Osha Bergman Watanabe & Burton LLP

(57) ABSTRACT

The invention proposes a stator for a rotating electric machine, in particular for a motor vehicle, the stator (15) including: —a body (27) including notches (37) that are opened radially into an internal wall (40) of said body, —at least one winding (43) forming a phase of the stator, the winding formed from turns (54) includes a first half-phase (49) and a second half-phase (50) that are superposed radially in the notch (37), each turn including a series of axial strands (44) that are received in a series of associated notches and connecting strands (45, 46) that connect the successive axial strands (44) by extending alternatively to protrude with respect to the body (27). A length of wire of each turn of one of the half-phases is larger than the length of wire of each turn of the other half-phase. Furthermore, (Continued)

one of the half-phases has a number of turns higher than that of the other half-phase.

9 Claims, 4 Drawing Sheets

(58) Field of Classification Search
USPC .......................................... 310/178, 180, 184
See application file for complete search history.

(56) References Cited

FOREIGN PATENT DOCUMENTS

| | | |
|---|---|---|
| FR | 2819118 A1 | 7/2002 |
| FR | 2846481 A1 | 4/2004 |
| FR | 2888059 A1 | 1/2007 |
| WO | 2005/029679 A1 | 3/2005 |

* cited by examiner

COILED STATOR FOR A ROTARY ELECTRICAL MACHINE

The invention relates in particular to a wound stator equipped with windings forming phases for a rotary electrical machine of a motor vehicle.

The invention has a particularly advantageous application in the field of rotary electrical machines such as alternators, alternator starters, or also reversible machines. It will be remembered that a reversible machine is a rotary electrical machine which can work reversibly, firstly as an electric generator when functioning as an alternator, and secondly as an electric motor, for example in order to start the thermal engine of the motor vehicle.

A rotary electrical machine comprises a rotor which is mobile in rotation around an axis, and a fixed stator surrounding the rotor. In alternator mode, when the rotor is rotating, it induces a magnetic field on the stator, which transforms it into electric current in order to supply power to the vehicle electronics and recharge the battery. In motor mode, the stator is supplied electrically, and induces a magnetic field which rotates the rotor.

The invention relates more particularly to a stator of a rotary electrical machine comprising an annular cylindrical body provided with axial notches which open out, in which electrical conductors are arranged such as to form a winding. In this case, the winding is formed by a plurality of phases, and is composed of conductors delimiting a series of turns or loops which are connected electrically in series, and form a circumferential winding. A winding comprises axial branches which pass through the notches, and connection branches disposed on the exterior of the cylindrical body which form the connection between the different axial branches. The connection branches then form a front chignon and a rear chignon extending projecting axially on both sides of the cylindrical body.

More particularly, a winding comprises a first half-phase forming an outer layer of turns, and a second half-phase forming an inner layer of turns superimposed radially in the notch on the outer layer, the inner layer being closer radially to the inner wall of the body than the outer layer. Each half-phase comprises a superimposition of identical turns in the form of regular stars following an axis coaxial to the axis of the machine.

The distribution of the number of turns between the half-phases is carried out such as to optimise the arrangement of the wire in the chignons, in order to reduce their size, and more particularly their thickness. The distribution is thus balanced, i.e. the first half-phase comprises as many turns as the second half-phase.

Stators comprising this type of winding are already known for example from document FR 2819118.

The objective of the present invention is to make it possible to optimise this type of winding in order to improve the performance of the rotary electrical machine.

For this purpose, the subject of the invention is thus a stator for a rotary electrical machine, in particular for a motor vehicle. According to the present invention, the stator comprises:
- a body comprising notches which open axially into front and rear axial end walls of the body, and are open radially in an inner wall of the said body;
- at least one winding forming a phase of the stator, the winding comprising a first half-phase forming an outer layer of turns, and a second half-phase forming an inner layer of turns superimposed radially in the notch on the outer layer, each turn comprising a wire formed by a series of axial strands which are received in a series of associated notches, and connection strands which connect the successive axial strands by extending alternately projecting relative to the front axial end wall and projecting relative to the rear axial end wall in order to form chignons.

According to the invention, a wire length of each turn of one of the half-phases is longer than the wire length of each turn of the other half-phase.

In addition, according to the invention, one of the half-phases has a number of turns greater than that of the other half-phase.

Unexpectedly, it has been found that the fact of creating imbalance of the number of turns between the half-phases does not affect the electromagnetic performance of the rotary electrical machine. This difference between the respective numbers of turns of the two half-phases, associated with the reduction in the wire length of each turn of one of the half-phases, makes it possible to reduce the total length of wire used in order to produce a winding. The resistance of the wire of a winding is thus reduced, as is its weight and its production cost. This therefore improves the global performance of the rotary electrical machine.

According to one embodiment, the difference between the number of turns of one of the half-phases and that of the other half-phase is strictly greater than 1. In other words, the difference is equal to 2 or more.

According to one embodiment, the half-phase with fewer turns is the one which has a shorter wire length.

According to one embodiment, the half-phase with fewer turns is disposed radially closer to the inner wall of the stator body than the half-phase with more turns.

For example, the wire length of each turn of the larger half-phase is greater by 2% to 10% than the wire length of each turn of the other half-phase.

According to one embodiment, the wire length of each turn of the second half-phase is longer than the wire length of each turn of the first half-phase, such that a projecting axial height of the inner chignons of the said second half-phase is greater than a projecting axial height of the outer chignons of the said first half-phase.

According to one embodiment, a projecting axial height of the chignons of one of the half-phases is substantially equal to an axial height of the chignons of the other half-phase, increased by a height which is globally equal to the radial thickness occupied by the axial strands of a half-phase in each associated notch.

According to one embodiment, the turns of each half-phase of a single winding undulate in opposition. Thus, the half-phases are wound in inverse directions relative to one another.

According to one embodiment, the contour in the form of a star of the first half-phase is offset angularly around the central axis relative to the contour in the form of a star of the second half-phase, such that the axial strands of the two half-phases are superimposed, and such that the connection strands of one of the half-phases extend radially between two connection strands of the other half-phase respectively.

According to one embodiment, the stator comprises at least one phase system comprising a plurality of windings.

According to one embodiment, within the same phase system, each winding has a half-phase with a number of turns greater than that of the other half-phase.

In particular, within the same phase system, each winding has the same distribution of turns between the half-phases. In other words, each winding of the same phase system is identical.

This makes it possible not to create imbalance of the resistances between the windings within a single phase system, and thus to prevent a decrease in the performance of the electrical machine.

According to one embodiment, the stator comprises two phase systems, with each phase system comprising at least one winding, and for example three windings.

According to another embodiment, the stator comprises a single phase system comprising at least one winding, and for example three windings.

The subject of the present invention is also a rotary electrical machine. The rotary electrical machine can advantageously form an alternator, an alternator-starter or a reversible machine.

The present invention will be able to be better understood by reading the following detailed description of non-limiting embodiments of the invention, and by examining the appended drawings in which.

Elements which are identical, similar or analogous retain the same references from one figure to another.

The embodiments which are described hereinafter are in no way limiting; in particular, it will be possible to conceive of variants of the invention which comprise only a selection of characteristics described hereinafter, isolated from the other characteristics described, if this selection of characteristics is sufficient to provide a technical advantage, or to differentiate the invention from the prior art. In particular, all the variants and all the embodiments described can be combined with one another, if nothing opposes this combination from a technical point of view. In such a case, this will be mentioned in the present description.

Figure 1:
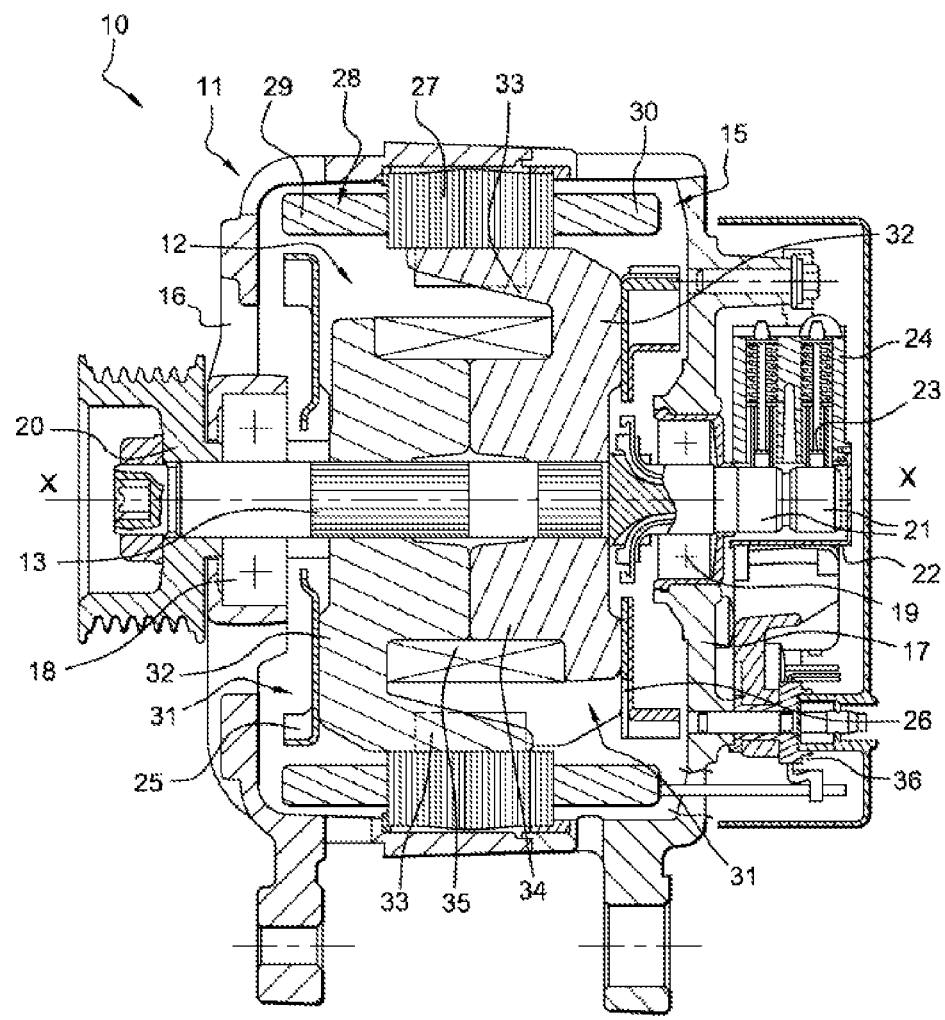
FIG. 1 represents schematically and partially a view in cross-section of a rotary electrical machine according to an embodiment of the invention.

FIG. 1 represents an example of a compact polyphase rotary electrical machine 10, in particular for a motor vehicle. This rotary electrical machine 10 transforms mechanical energy into electrical energy in alternator mode, and can operate in motor mode in order to transform electrical energy into mechanical energy. This rotary electrical machine 10 is for example an alternator, an alternator-starter or a reversible machine.

The rotary electrical machine 10 comprises a housing 11. In the interior of this housing 11 it also comprises a shaft 13, a rotor 12 which is integral in rotation with the shaft 13, and a stator 15 which surrounds the rotor 12. The movement of rotation of the rotor 12 takes place around an axis X.

Hereinafter in the description, the terms axial, radial, external and internal refer to the axis X which passes through the shaft 13 in its centre. The axial direction corresponds to the axis X, whereas the radial orientations correspond to planes which are concurrent with, and in particular perpendicular to, the axis X. For the radial directions, the terms external or internal are understood relative to the same axis X, with the term internal corresponding to an element which is oriented towards the axis, or closer to the axis than a second element, and the term external designating distancing from the axis.

In this example, the housing 11 comprises a front bearing 16 and a rear bearing 17 which are assembled together. These bearings 16, 17 have a hollow form, and each support centrally a respective ball bearing 18, 19 for fitting of the shaft 13 with rotation.

A pulley 20 is secured on a front end of the shaft 13, at the front bearing 16, for example by means of a nut supported on the base of the cavity of this pulley. This pulley 20 makes it possible to transmit the movement of rotation to the shaft 13.

In this case, the rear end of the shaft 13 supports collector rings 21 belonging to a collector 22. Brushes 23 belonging to a brush-holder 24 are disposed such as to rub on the collector rings 21. The brush-holder 24 is connected to a voltage regulator (not represented).

The front bearing 16 and the rear bearing 17 can also comprise substantially lateral openings for the passage of the air, for the purpose of permitting cooling of the rotary electrical machine by circulation of air generated by the rotation of a front fan 25 on the front dorsal face of the rotor 12, i.e. at the front bearing 16, and by the rotation of a rear fan 26 on the rear dorsal face of the rotor, i.e. at the rear bearing 17.

In this example, the rotor 12 is a rotor with claws. It comprises two magnet wheels 31. Each magnet wheel 31 is formed by a flange 32 and a plurality of claws 33 forming magnetic poles. The flange 32 has transverse orientation, and has for example a substantially annular form. This rotor 12 also comprises a cylindrical core 34 which is interposed axially between the magnet wheels 31. In this case, this core 34 is formed by two half cores each belonging to one of the magnet wheels. Between the core 34 and the claws 33, the rotor 12 comprises a coil 35, which in this case comprises a winding hub and an electrical winding on this hub. For example, the collector rings 21 belonging to the collector 22 are connected by wired connections to the said coil 35. The rotor 12 can also comprise magnetic elements interposed between two adjacent claws 33.

Figure 2:
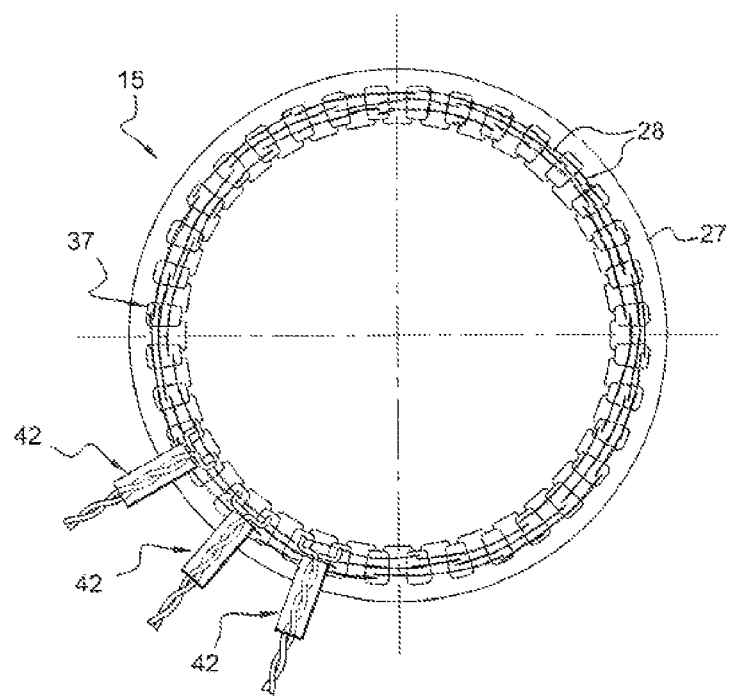
FIG. 2 represents schematically and partially a view from above of a wound stator according to an embodiment of the invention.

As illustrated in the example in FIG. 2, the stator 15 comprises an annular cylindrical body 27 in the form of a set of metal plates provided with notches 37. Each notch 37 opens axially into front 38 and rear 39 axial end walls of the body 27, and is open radially in an inner wall 40 of the said body.

An electrical winding 28 is fitted on the body 27. This winding 28 passes through the notches 37 in the body 27 and forms a front chignon 29 and a rear chignon 30 on both sides of the body of the stator. The stator 15 can be equipped with notch insulation for fitting of an electrical winding 28 in the interior of the notches and/or with closure wedges 41 which permit the retention of the winding in the interior of the notches 37. The winding 28 is connected for example in the form of a star or also a triangle.

The winding 28 is formed by a plurality of phases, with each phase forming a winding 43. Each winding comprises at least one conductor passing through the notches 37, and forms the chignons together with all the phases. The winding 28 is connected electrically via phase outputs 42 to an electronic assembly 36.

The electronic assembly 36 comprises at least one electronic power module, which makes it possible to control a phase of the winding 28. This power module forms a voltage rectifier bridge, in order to transform the alternating voltage generated by the alternator 10 into a direct voltage, in particular in order to supply the battery and the on-board network of the vehicle with power.

When the electrical winding 28 is supplied electrically from the brushes, the rotor 4 is magnetised and becomes an inductor rotor with formation of North-South magnetic poles at the claws 19. This inductor rotor creates an induced alternating current in the armature stator when the shaft 3 is rotating. The rectifier bridge 9 then transforms this induced alternating current into a direct current, in particular in order to supply power to the loads and consumers of the on-board network of the motor vehicle, as well as to recharge its battery.

As illustrated in FIGS. 3 to 7, a winding 43 comprises undulating turns 54 of one or a plurality of wires. Each turn 54 comprises a series of axial strands 44, which are received in an associated series of notches 37, and connection strands 45, 46 which connect the successive axial strands by extending projecting alternately relative to the front axial end wall and projecting relative to the rear axial end wall. Thus, the upper connection strands 45 form the front chignon 29, and the lower connection strands 46 form the rear chignon 30 of the electrical winding 28.

Figure 6:
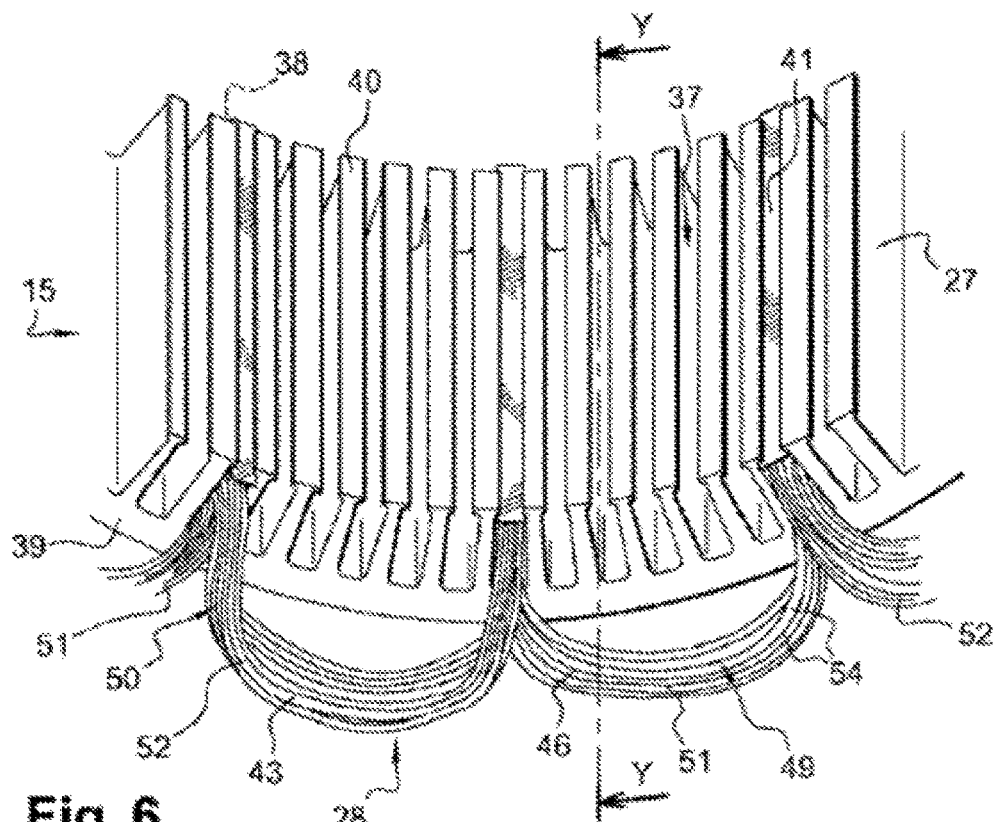
FIG. 6 represents schematically and partially a view in perspective of part of a stator wound partially (comprising a winding) according to the present invention.
Figure 7:
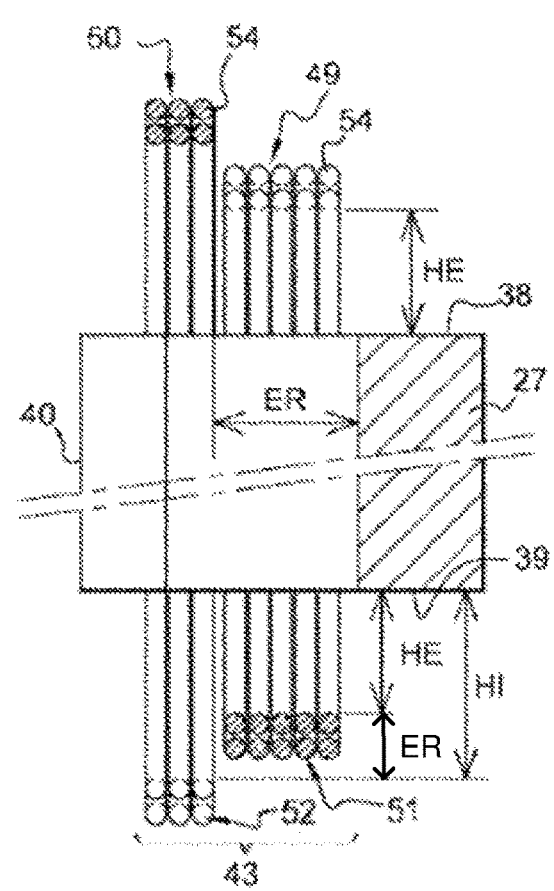
FIG. 7 represents schematically and partially a view in cross-section according to the plane Y-Y in FIG. 6.

In the example represented in FIGS. 6 and 7, the electrical winding 28 is a double three-phase winding, i.e. comprising six phases or six windings 43. This winding 28 thus comprises a first phase system 47 and a second phase system 48, each comprising three windings 43. A series of notches 37 is associated with one of the six windings 43. Two consecutive notches of a single series of notches are separated by adjacent notches, each corresponding to another series of notches associated with one of the five other windings 43. Thus, for a hexaphase stator as in the example taken here, five adjacent notches are left free between two notches of each series. In other words, the wires of a winding 43 are inserted in one notch out of six adjacent notches. Alternatively, the electrical winding 28 can comprise another number of phases, for example, as represented in FIG. 2, the electrical winding 28 can be a three-phase winding comprising three phases.

In order to simplify the understanding of FIGS. 3 to 7, the stator has been represented with a single winding, however a stator of this type comprises for example six windings or also three windings which are analogous to the one which is represented in the said figures.

Each winding 43 comprises a first half-phase 49 forming an outer layer 51 of turns 54, and a second half-phase 50 forming an inner layer 52 of turns 54 superimposed radially in the notch 37 on the outer layer 51. The two half-phases 49, 50 are connected electrically to one another by a connection portion 53.

This inner layer 52 is closer radially to the inner wall 40 of the body 27 than the outer layer 51. Thus, the axial strands 44 of each half-phase are disposed in the notches 37, such that the axial strands of the second half-phase 50 are radially closer to the inner wall 40 than the axial strands of the first half-phase 49. The connection strands 45, 46 of the first half-phase 49 form outer chignons belonging to the outer layer 51, and the connection strands 45, 46 of the second half-phase 50 form inner chignons belonging to the outer layer 52. Each front 29 and rear 30 chignon is composed of an inner chignon and an outer chignon.

Each half-phase 49, 50 comprises a superimposition of identical turns in the form of regular stars with an axis A, the axis A being coaxial to the axis X of the machine.

The turns of each half-phase 49, 50 of a single winding 43 undulate in opposition. Thus, the upper connection strands 45 of the first half-phase 49 and the upper connection strands 45 of the second half-phase 50 are offset angularly around the axis A, and similarly for the lower connection strands 46. In addition, the turns of the first half-phase 49 are wound for example in the clockwise direction, and the turns of the second half-phase 50 are wound in the anticlockwise direction.

This type of winding is known by the name of "distributed undulating". A winding of this type and its insertion method are described for example in document FR 2846481.

A known method for insertion of the windings 43 in the body 27 of the stator is described briefly hereinafter.

In a first assembly step, this phase winding 43 is formed flat, i.e. the turns 54 each extend on a plane substantially perpendicular to the axis A. In a second assembly step, the winding 43 is fitted on the body 27 of the stator by means of deformation. More specifically, the winding 43 is positioned in the notches 37 by progressive torsion of the axial strands 44 axially from the rear forwards and by simultaneous tilting of all the axial strands from a direction perpendicular to the axis A, to a direction parallel to the said axis A. This deformation is obtained for example by sliding an insertion block not represented here.

These assembly steps are then repeated such as to insert the other windings 43 in order to form the electrical winding 28.

In order to facilitate the insertion of the other windings, the chignons of the outer 51 and inner 52 layers of the winding already fitted are thrust back radially towards the exterior in order to open up the axial orifices of the free notches which do not form part of the series of notches associated with this winding. This operation makes it possible to open up the axial orifices of the notches in order not to impede the insertion of the other windings, and in particular not to interfere with the other chignons.

For each half-phase 49, 50, the axial strands 44 have an identical length. However, the connection strands 45, 46 of the second half-phase 50 are longer than the connection strands 45, 46 of the first half-phase 49.

More particularly, the upper connection strands 45 of the second half-phase 50 are arranged on a circle with a diameter D4 centred on the axis A, with the diameter D4 being larger than the diameter D2 of the circle on which the upper connection strands 45 of the first half-phase 49 extend.

In addition, the lower connection strands 46 of the second half-phase 50 are arranged on a circle with a diameter D3 centred on the axis A, with the diameter D3 being larger than the diameter D1 of the circle on which the lower connection strands 46 of the first half-phase 49 extend.

Figure 4:
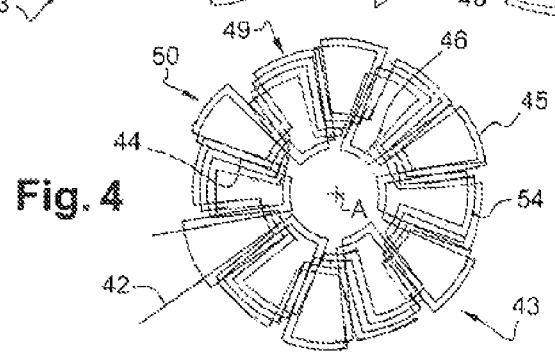
FIG. 4 represents schematically and partially a view from above which represents the winding of FIG. 3 in which the two half-phases are superimposed axially.
Figure 5:
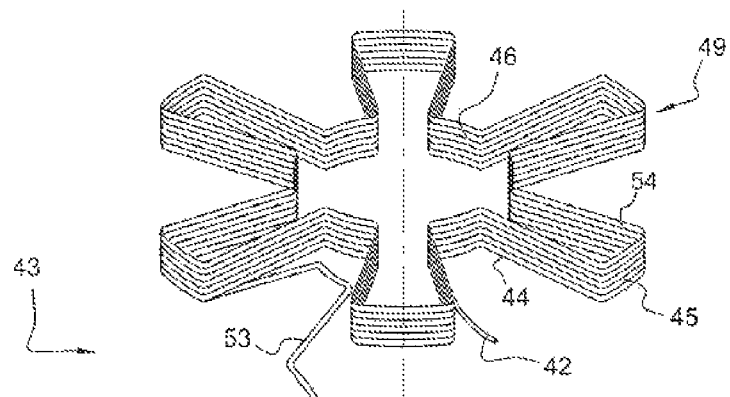
FIG. 5 represents schematically and partially a view in perspective of the two half-phases of the winding in FIG. 4.

Thus, as represented in FIG. 4, the connection strands 45, 46 of the second half-phase 50 extend radially further towards the interior and towards the exterior than those of the said half-phase 49.

More particularly, the length of the connection strands 45, 46 of the second half-phase 50 is in this case equal to the length of the connection strands 45, 46 of the first half-phase 49, increased by a radial thickness ER which the axial strands 44 will occupy in an associated notch 37, when the winding 43 is fitted in the stator body 27.

For example, the wire length of each turn 54 of the second half-phase 50 is larger by 2% to 10% than that of each turn 54 of the first half-phase 49.

Thus, as represented in FIG. 7, when a winding 43 is fitted on the body 27, the chignons of the inner layer 52 have an axial height HI which is greater than an axial height HE of the chignons of the outer layer 51. The axial height of a chignon is defined as being the axial distance between one of the axial end walls 38, 39 of the body 27 from which the chignon extends axially, and the point furthest from the internal arch formed by the said chignon.

Thus, when the chignons are thrust back radially towards the exterior, the notches 37 are perfectly opened up for the insertion of the other windings, but none of the chignons extends radially to the exterior of the body of the stator, and the size of the machine is thus decreased.

In addition, as can be seen clearly in FIGS. 3 to 7, one of the half-phase is 49, 50 of the winding 43 has a number of turns 54 greater than that of the other half-phase 49, 50.

In particular, the half-phase 49, 50 with fewer turns 54 is the one which has a shorter wire length. Thus, in this case, the first half-phase 49 has a number of turns 54 greater than the second half-phase 50.

Figure 3:
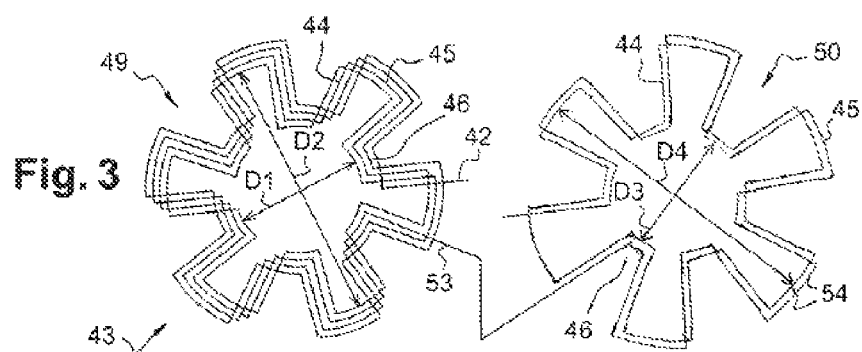
FIG. 3 represents schematically and partially an exploded view from above which represents two half-phases of winding before they are fitted in the notch according to an example of the present invention.

In the example in FIG. 3, the winding 43 comprises six turns 54. These turns 54 are distributed such that the first half-turn comprises four turns 54, and the second half-phase comprises two turns 54.

In another example illustrated in FIG. 7, the winding 43 comprises eight turns 54. These turns 54 are distributed such that the first half-phase comprises five turns 54, and the second half-phase comprises three turns 54.

According to another example not represented, the winding 43 could comprise seven turns 54. These turns 54 could then be distributed such that the first half-phase comprises five turns 54, and the second half-phase comprises two turns 54.

Preferably, the difference between the number of turns 54 of one of the half-phases 49, 50 and that of the other half-phase 49, 50 is strictly greater than 1.

Preferably, all the windings 43 of a single phase system have a half-phase 49, 50 with a number of turns 54 greater than that of the other half-phase 49, 50. In particular, the windings 43 of this same phase system have the same distribution of the number of turns 54 between the first and the second half-phases, in order not to create imbalance of the respective resistances of the said windings 43. In addition, all the windings 43 of the electrical winding 28 have a half-phase 49, 50 with a number of turns 54 greater than that of the other half-phase 49, 50, and in particular the same distribution of the number of turns 54 between the half-phases.

Preferably, the two half-phases 49, 50 and the connection portion 53 are constituted by a single wire or by a single bundle of at least two wires in parallel.

According to a variant embodiment not represented, at least one of the windings 43 can have total wire length which is shorter than that of the other windings. Total wire length means the length of the wire between the portions of the wire which form the phase outputs 42. In this embodiment, at least one winding 43 of the second phase system 48 has a wire length which is shorter than that of a winding 43 of the first phase system 47. In particular, the three windings 43 of the second phase system 48 each have a wire length which is shorter than that of the three windings 43 of the first phase system 47. Preferably, within a single phase system, the windings 43 have the same wire length.

Preferably, the wire diameter used for the different windings remains the same from one phase system to another.

The invention has been described with reference to a method in which the windings are fitted in succession one after another in the stator body. However, the invention is also applicable for assembly methods in which at least two windings, or even all the windings, are fitted simultaneously in the stator body.

The present invention has applications in particular in the field of stators for alternators or reversible machines, but it could also be applied to any type of rotary machine.

It will be appreciated that the foregoing description has been provided purely by way of example, and does not limit the field of the present invention, a departure from which would not be constituted by replacing the different elements by any other equivalents.

The invention claimed is:

1. A stator for a rotary electrical machine for a motor vehicle, the stator comprising:
   a body comprising notches which open axially into front and rear axial end walls of the said body, and are open radially in an inner wall of the said body;
   at least one winding forming a phase of the stator, the winding comprising a first half-phase forming an outer layer of turns, and a second half-phase forming an inner layer of turns superimposed radially in the notch on the outer layer,
   each turn comprising a wire formed by a series of axial strands which are received in a series of associated notches, and connection strands which connect the successive axial strands by extending alternately projecting relative to the front axial end wall and projecting relative to the rear axial end wall in order to form chignons,
   wherein a wire length of each turn of one of the half-phases is longer than the wire length of each turn of the other half-phase, and one of the half-phases has a number of turns greater than that of the other half-phase,
   wherein the difference between the number of turns of one of the half-phases and that of the other half-phase is strictly greater than 1, and
   wherein the half-phase with more turns is the one which has a shorter wire length for each turn.

2. The stator according to claim 1, wherein the half-phase with fewer turns is disposed radially closer to the inner wall of the stator body than the half-phase with more turns.

3. The stator according to claim 2, wherein the turns of each half-phase of a single winding undulate in opposition.

4. The stator according to claim 1, wherein the wire length of each turn of the larger half-phase is greater by 2% to 10% than the wire length of each turn of the other half-phase.

5. The stator according to claim 4, wherein a projecting axial height (HI) of the chignons of one of the half-phases is substantially equal to an axial height (HE) of the chignons of the other half-phase, increased by a height which is equal to a radial thickness (ER) occupied by the axial strands of a half-phase in each associated notch.

6. The stator according to claim 1, wherein the stator comprises at least one phase system comprising a plurality of windings, and, within the same phase system, each winding has the same distribution of turns between the half-phases.

7. A rotary electrical machine comprising a stator according to claim 1.

8. The rotary electrical machine according to claim 7, forming an alternator, an alternator-starter or a reversible machine.

9. A stator for a rotary electrical machine for a motor vehicle, the stator comprising:

a body comprising notches which open axially into front and rear axial end walls of the said body, and are open radially in an inner wall of the said body;

at least one winding forming a phase of the stator, the winding comprising a first half-phase forming an outer layer of turns, and a second half-phase forming an inner layer of turns superimposed radially in the notch on the outer layer, each turn comprising a wire formed by a series of axial strands which are received in a series of associated notches, and connection strands which connect the successive axial strands by extending alternately projecting relative to the front axial end wall and projecting relative to the rear axial end wall in order to form chignons, wherein a wire length of each turn of one of the half-phases is longer than the wire length of each turn of the other half-phase, and in that one of the half-phases has a number of turns greater than that of the other half-phase, and wherein a projecting axial height (HI) of the chignons of one of the half-phases is substantially equal to an axial height (HE) of the chignons of the other half-phase, increased by a height which is equal to a radial thickness (ER) occupied by the axial strands of a half-phase in each associated notch.

* * * * *